United States Patent
Riedle et al.

(10) Patent No.: US 9,731,725 B2
(45) Date of Patent: Aug. 15, 2017

(54) CONTROL OF VEHICLE DRIVELINE TORQUE

(75) Inventors: Bradley D. Riedle, Northville, MI (US); Brad W. Probert, Farmington Hills, MI (US); Jianping Zhang, Ann Arbor, MI (US); Kenneth E. Sovel, Commerce Township, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 1259 days.

(21) Appl. No.: 13/603,540

(22) Filed: Sep. 5, 2012

(65) Prior Publication Data

US 2014/0067229 A1    Mar. 6, 2014

(51) Int. Cl.
*B60T 7/12*    (2006.01)
*B60W 30/188*    (2012.01)
*B60W 30/184*    (2012.01)

(52) U.S. Cl.
CPC ....... *B60W 30/1882* (2013.01); *B60W 30/184* (2013.01)

(58) Field of Classification Search
CPC combination set(s) only.
See application file for complete search history.

(56) References Cited

U.S. PATENT DOCUMENTS

| | | | |
|---|---|---|---|
| 4,982,620 A | 1/1991 | Holbrook et al. | |
| 4,991,097 A | 2/1991 | Fodale et al. | |
| 5,123,302 A | 6/1992 | Brown et al. | |
| 5,826,208 A * | 10/1998 | Kuroiwa | B60W 10/06 477/115 |
| 6,150,780 A | 11/2000 | Young et al. | |
| 6,259,986 B1 * | 7/2001 | Kotwicki | F02D 41/2441 477/113 |
| 6,508,739 B1 | 1/2003 | Bellinger | |
| 6,701,246 B2 | 3/2004 | Riedle et al. | |
| 6,991,585 B2 * | 1/2006 | Colvin | F16D 48/066 477/174 |
| 7,101,313 B2 | 9/2006 | Kresse et al. | |
| 7,421,327 B2 | 9/2008 | Romer et al. | |
| 7,676,315 B2 | 3/2010 | Doering et al. | |
| 7,974,760 B2 | 7/2011 | Rowley et al. | |
| 8,027,780 B2 | 9/2011 | Whitney et al. | |
| 2004/0143384 A1 | 7/2004 | Graf et al. | |
| 2006/0020384 A1 * | 1/2006 | Smith | B60W 10/02 701/54 |
| 2007/0142174 A1 | 6/2007 | Swank et al. | |
| 2009/0149298 A1 * | 6/2009 | Otanez | G01M 13/022 477/176 |
| 2011/0144893 A1 * | 6/2011 | Rollinger | F02D 35/027 701/111 |
| 2011/0166757 A1 | 7/2011 | Otanez et al. | |

* cited by examiner

*Primary Examiner* — Hussein A. Elchanti
(74) *Attorney, Agent, or Firm* — James Dottavio; MacMillan, Sobanski & Todd, LLC

(57) ABSTRACT

A method for controlling a vehicle driveline includes determining, for current vehicle operating conditions, an initial engine output torque, at which the driveline meets predetermined structural criteria, establishing a factor that varies with torque converter slip, determining an engine torque limit by multiplying the factor corresponding to a current torque converter slip by the initial engine output torque, and limiting torque produced by an engine connected to the driveline to the engine torque limit.

9 Claims, 4 Drawing Sheets

1

CONTROL OF VEHICLE DRIVELINE TORQUE

BACKGROUND OF THE INVENTION

1. Field of the Invention

This invention relates generally to controlling vehicle driveline torque, particularly through engine output torque delivery during high demand operating conditions, which should occur infrequently in the life of a vehicle, while limiting torque to protect driveline components from fatigue type failures during more normal operation.

2. Description of the Prior Art

Vehicle driveline components, such as transmissions, driveshaft, axles, etc., have a finite fatigue life when subjected to input torque loads during the life of the vehicle. Empirical data is often used to establish a relation between the magnitude of the torque load and the number of applied cyclic applications of that load before fatigue failure of the tested component occurs.

To ensure an acceptable length of service life of the component under normal use, torque limitations may be applied to prevent the application of high magnitudes of torsional loading on a regular, recurring basis. Because such high magnitudes of torque are lower than the ultimate strength and yield strength limits of the component, a limited number of cycles at high torque magnitudes would not have a substantial adverse affect on the component's fatigue strength.

A need exists in the field of vehicle driveline control for a strategy that permits application of higher magnitudes of torque in certain non-typical conditions, yet excludes such torque magnitudes during regular use when larger numbers of cycle occur.

SUMMARY OF THE INVENTION

A method for controlling a vehicle driveline includes determining, for current vehicle operating conditions, an initial engine output torque, at which the driveline meets predetermined structural criteria, establishing a factor that varies with torque converter slip, determining an engine torque limit by multiplying the factor corresponding to a current torque converter slip by the initial engine output torque, and limiting torque produced by an engine connected to the driveline to the engine torque limit.

A vehicle driveline includes an engine, a torque converter connected to a crankshaft of the engine, a transmission connected to a turbine of the torque converter, a differential connected to an output of the transmission, axle shafts connecting the differential to wheels, a controller including a processor configured to determine for current vehicle operating conditions an initial engine output torque at which the torque converter, transmission and differential meet predetermined structural criteria, and to determine an engine torque limit by multiplying a factor corresponding to a current torque converter slip by the initial engine output torque, and an engine controller configured to limit torque produced by an engine connected to the driveline to the engine torque limit.

The method creates an operational area where extra engine torque is delivered through the driveline, while limiting the effect of fatigue cycles on failure of driveline components. The method allows for high levels of torque to launch or accelerate the vehicle in challenging situations, such as when the vehicle is fully loaded and starting from a stop on a steep grade. This method utilizes converter slip because slip is a readily-available signal to the powertrain controller and it differentiates between extreme and normal operating conditions of vehicle mass, road grade, resistance to motion, etc.

The method enhances the ability to launch the vehicle on a grade, without requiring axle ratio increases that could increase engineering development costs and decrease fuel economy.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
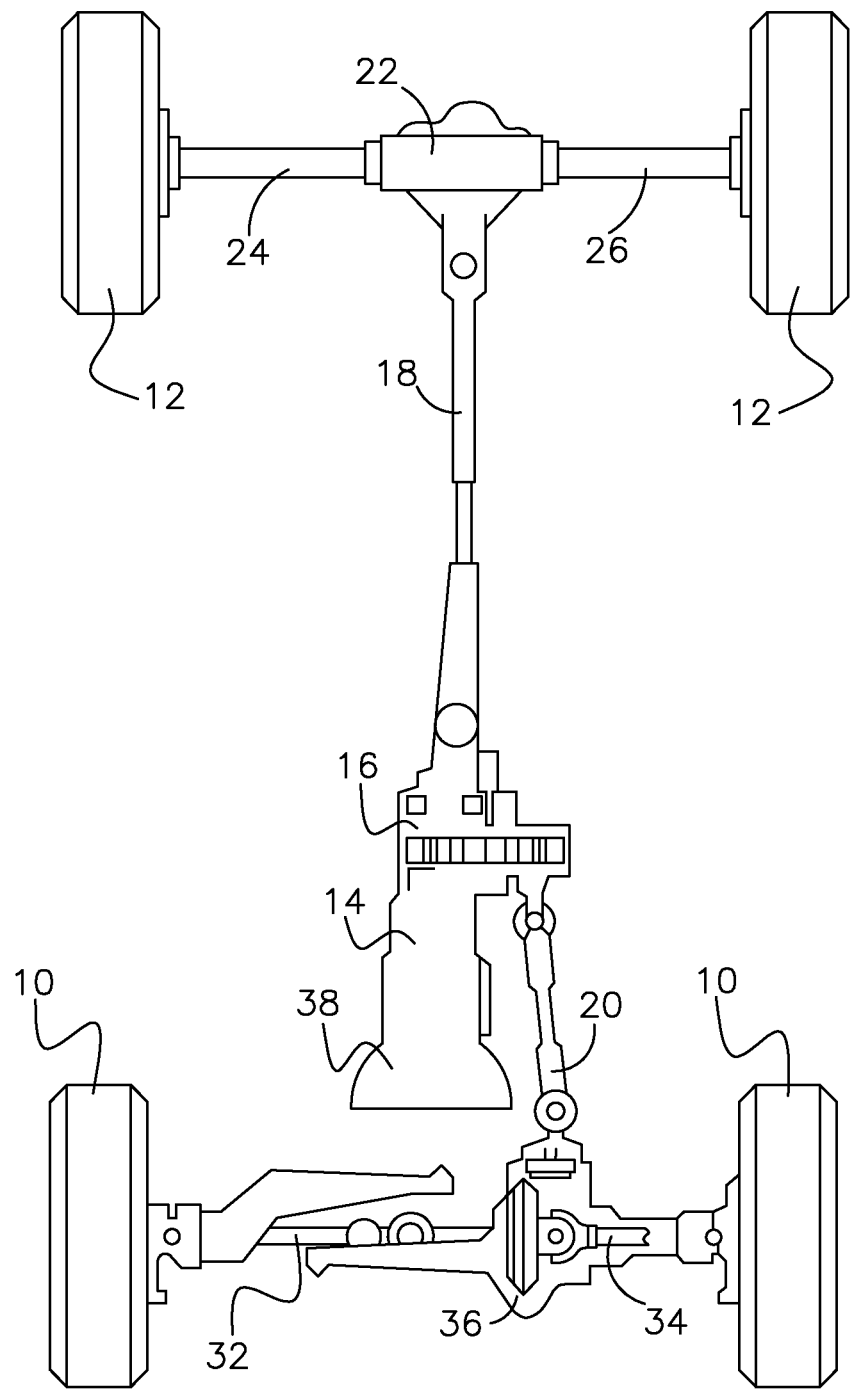
FIG. 1 is a top view of a motor vehicle driveline having a transmission, transfer case, and drive shafts extending to the front wheels and rear wheels.

Referring to FIG. 1, a motor vehicle driveline includes front and rear wheels 10, 12, a power transmission assembly 14 that produces multiple forward speed ratios and at least one reverse speed ratio, and a transfer case assembly 16.

When two-wheel drive (2WD) operation of the driveline is selected, the transfer case assembly 16 driveably connects the transmission output to a rear drive shaft 18. When four-wheel-drive (4WD) operation is selected, the transfer case 16 connects the transmission output concurrently to both the front drive shaft 20 and rear drive shaft 18. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand axle shafts 32, 34, to which power is transmitted from the front drive shaft 20 through a front differential 36.

Figure 2:
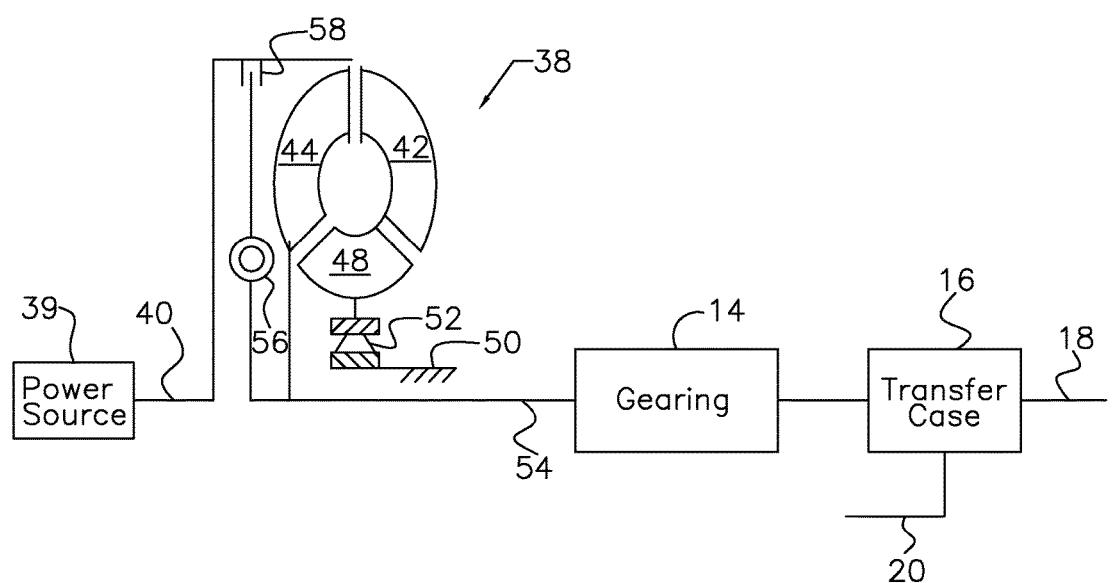
FIG. 2 is a schematic diagram showing a vehicle driveline including a power source, torque converter, and the transmission input.

FIG. 2 shows a portion of the driveline between an internal combustion engine 39, or another power source, and the transmission 14, wherein the hydrokinetic torque converter 38 is driveably connected to the engine crankshaft 40, which is connected to a bladed impeller 42 of the torque converter. A bladed turbine 44, a bladed stator 48, and the impeller 42 define a toroidal fluid flow circuit within the casing of the torque converter. The stator 48 is supported on a stationary sleeve shaft 50, and an overrunning brake 52 anchors the stator to shaft 50 to prevent rotation of stator 48 in a direction opposite to the direction of rotation of the impeller, although free-wheeling motion in the opposite direction is permitted. Turbine 44 is connected to transmission input shaft 54. Torsion damper 56 and lock-up clutch 58 are arranged in series between crankshaft 40 and the transmission input shaft 54. When clutch 58 is engaged, the engine drives input shaft 54 through a direct mechanical connection, but when clutch 58 is disengaged, shaft 54 is connected hydrodynamically to the engine through the torque converter.

The transmission 14 includes gears, shafts, bearings, clutches, brakes, hydraulically controlled servos, and other components, which operate to produce the forward and reverse drive ratios.

Each of the major components of the various assemblies of the driveline must have capacity to meet and exceed predetermined structural criteria including ultimate torsional strength, yield torsional strength, fatigue torsional strength, torsional endurance limit, torsional service life, torsional displacement, etc. associated with the magnitude of torque transmitted from the engine 39 through the driveline. Factors that affect these structural criteria include the transmission gear ratio, engine torque amplification produced by the torque converter 38, the selected 2WD and 4WD operation, vehicle acceleration, vehicle mass, road grade, resistance to motion, etc.

Figure 3:
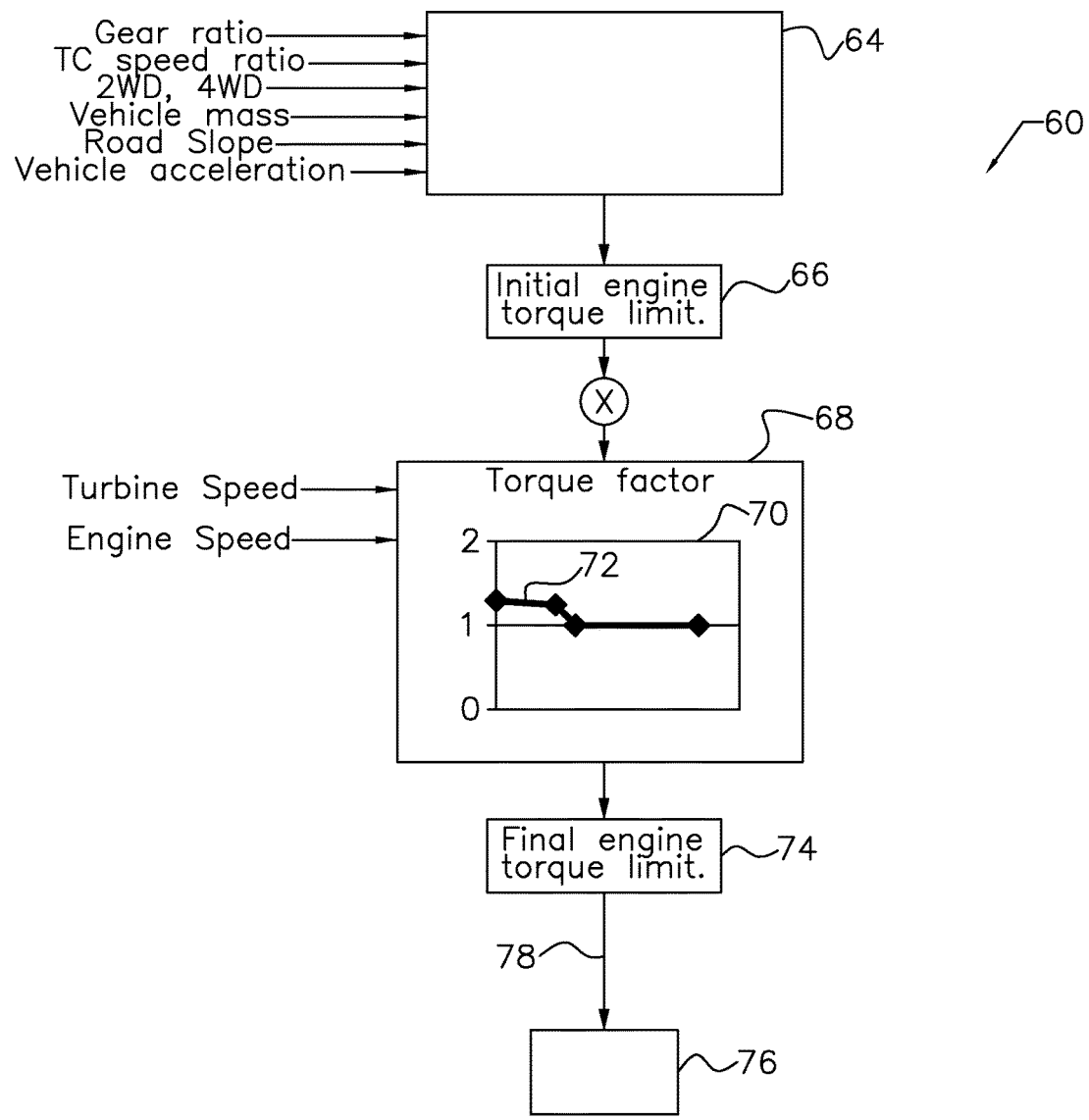
FIG. 3 is algorithm for determining the final engine torque limit and controlling the engine output torque.

Torque converter speed ratio, the turbine speed divided by engine speed, is used in the algorithm 60 of FIG. 3 as a calibration function that is implemented to provide an increase in engine output torque, which is transmitted to the input of the vehicle driveline.

The control method steps of algorithm 60 are stored in electronic memory in a computer-readable medium accessible by an electronic processor 64, which is able to control operation of the transmission 14, transfer case 16 and differential 22. The method of the algorithm is implemented using the electronic processor 64.

When the vehicle is being launched, i.e., accelerated from a stop or nearly stopped condition, the processor 64 determines an initial engine output torque limit for the current driving conditions, represented by vehicle load, vehicle acceleration, gear ratio, torque converter speed ratio, etc. The initial engine output torque limit accounts for the torque transmitted to each of the critical driveline components and the effects of amplification of engine output torque produced by the torque converter 38 and the gear ratio produced by the transmission 14. The acceptable engine output torque limit for the combination of current driving conditions accounts for (i) the torsional load applied to the most torsionally critical of the driveline components due to engine output torque, and (ii) the structural criteria that each such component must meet.

Preferably the processor 64 determines an initial engine output torque limit at step 66 for each of the driveline components from look-up tables for each driveline component, the tables being indexed by the combination of the current driving conditions.

At step 68, processor 64 uses the current measured slip across the torque converter 38, i.e., the difference between turbine speed and engine speed to determine from a function 70, stored in computer-readable medium accessible by an electronic processor 64, the torque uplift factor 72.

Figure 4:
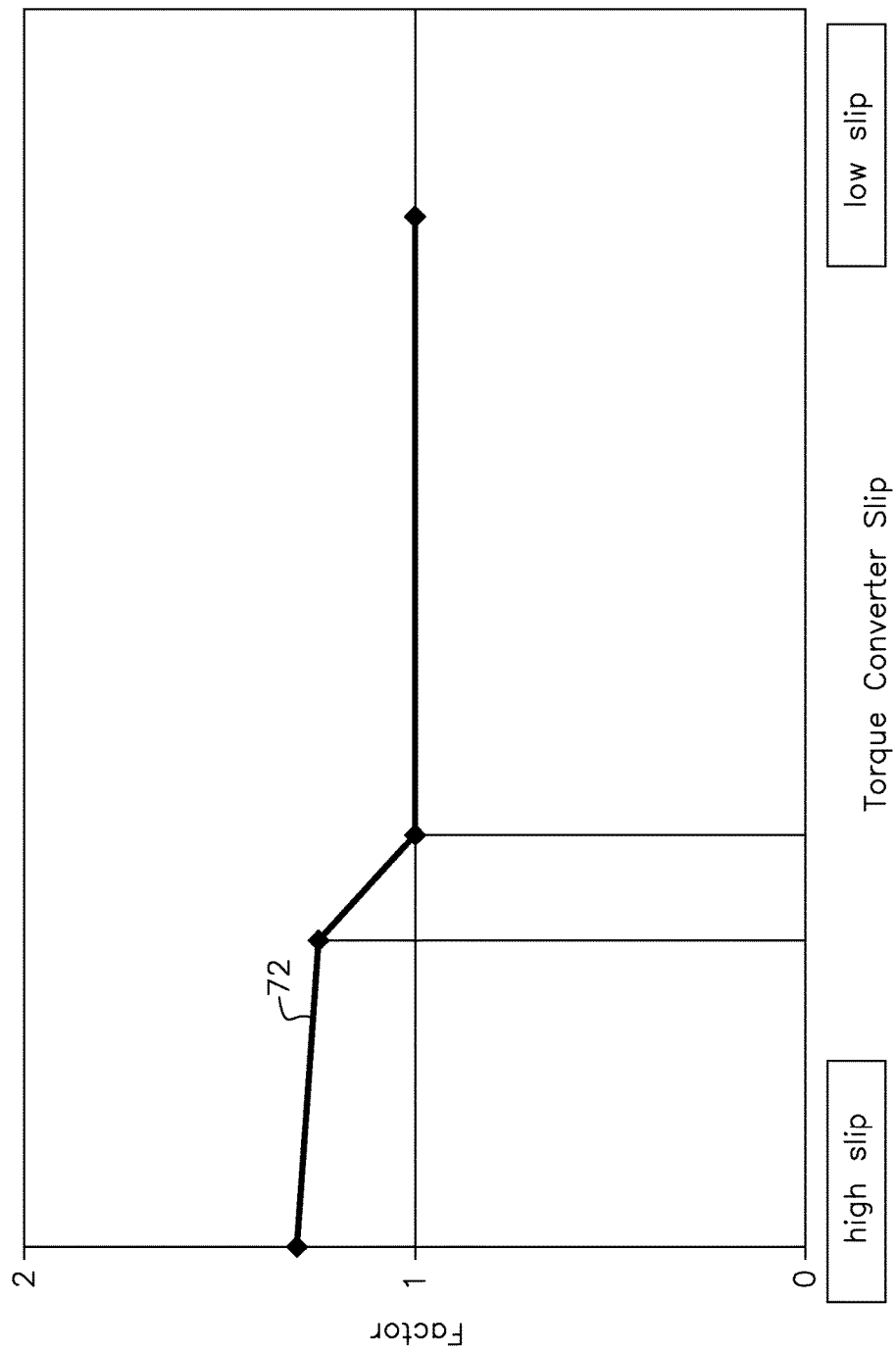
FIG. 4 is a graph showing the variation a function that corrects an initial engine torque limit.

FIG. 4 shows a preferred variation of factor 72 as a function 70 of torque converter slip.

Processor 64 produces at step 74 the final engine torque limit, which is the product of factor 70 multiplied by the initial engine torque limit.

An engine controller 76 responds to final engine torque limit signal 78 by producing engine output torque that is no greater than the final engine torque limit.

The function 70 produces an increase in allowed engine output torque at lower speed ratios, close to torque converter stall, and then blends back to normal allowed levels at the higher speed ratios. In practice, this allows increased engine torque in rare full-stall conditions, but ramps out the engine torque increase shortly after the wheels start rolling.

When the power source 50 is a diesel engine, the higher speed ratios coincide with the time when boost from a turbocharger is achieved. Therefore, higher levels of combustion torque during full torque converter stall is allowed when the engine is not able to meet the torque limitations, but engine torque is restored to normal limits when the engine is able to meet the torque limits.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle driveline, comprising:
   determining, for current vehicle operating conditions, an initial engine output torque, at which the driveline meets predetermined structural criteria;
   establishing a factor that varies with torque converter slip;
   determining an engine torque limit by multiplying the factor corresponding to a current torque converter slip by the initial engine output torque;
   limiting torque produced by an engine connected to the driveline to the engine torque limit.

2. The method of claim 1, wherein the factor is greater than unity when the current torque converter slip is relatively large and the factor is equal to unity when the current torque converter slip is relatively low.

3. The method of claim 1, wherein the step of determining an initial engine output torque further comprises:
   establishing predetermined magnitude of engine output torque at which an ultimate torsional strength, a yield torsional strength, a fatigue torsional strength and a torsional endurance limit of components of the driveline are not exceed by engine torque produced by the engine.

4. The method of claim 1, wherein a magnitude of the engine torque limit is greater than a magnitude of the initial engine output torque.

5. The method of claim 1, wherein the engine torque limit is greater than a magnitude of the initial engine output torque.

6. A vehicle driveline comprising:
   an engine;
   a torque converter connected to a crankshaft of the engine;
   a transmission connected to a turbine of the torque converter
   a differential connected to an output of the transmission;
   axle shafts connecting the differential to wheels;
   a controller including a processor configured to determine for current vehicle operating conditions an initial engine output torque at which the torque converter, transmission and differential meet predetermined structural criteria, and to determine an engine torque limit by multiplying a factor corresponding to a current torque converter slip by the initial engine output torque; and
   an engine controller configured to limit torque produced by an engine connected to the driveline to the engine torque limit.

7. The vehicle driveline of claim 6 wherein the processor is further configured to limit engine torque produced by the engine to a predetermined magnitude of engine output torque at which an ultimate torsional strength, a yield torsional strength, a fatigue torsional strength and a torsional endurance limit of components of the driveline are not exceeded.

8. A method for controlling a vehicle driveline, comprising:
  limiting torque produced by an engine connected to the driveline to an engine torque limit based on an initial engine output torque for current vehicle operating conditions and a torque converter slip factor, wherein the initial engine output torque is based on a predetermined magnitude of engine output torque at which an ultimate torsional strength, a yield torsional strength, a fatigue torsional strength and a torsional endurance limit of components of the driveline are not exceeded by engine torge produced by the engine.

9. The method of claim 8, wherein the torque converter slip factor is greater than unity when the current torque converter slip is relatively large and the torque converter slip factor is equal to unity when the current torque converter slip is relatively low.

* * * * *